June 12, 1928. 1,673,663
V. CHANCELLOR ET AL
METHOD OF SEPARATING GAS AND WATER FROM OIL AND APPARATUS THEREFOR
Filed Feb. 27, 1926
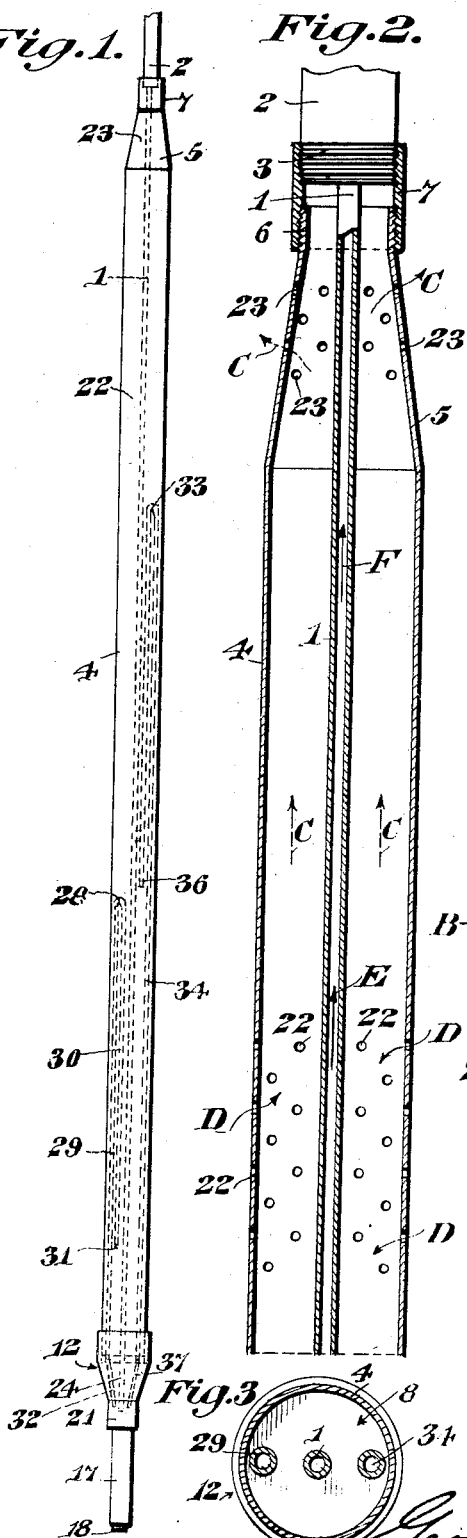

Patented June 12, 1928.

1,673,663

UNITED STATES PATENT OFFICE.

VICTOR CHANCELLOR AND SEBASTIAN L. CALVERT, OF TULSA, OKLAHOMA.

METHOD OF SEPARATING GAS AND WATER FROM OIL AND APPARATUS THEREFOR.

Application filed February 27, 1926. Serial No. 91,272.

This invention relates to a method of separating gas and water from oil and an apparatus therefor, and has for its object to provide, in a manner as hereinafter set forth, during the pumping operation with respect to an oil well, the automatic separation of the oil and water from the gas by gravity, separation of the water from the oil by gravity, the collecting of the separated water to a predetermined level, the collecting of the separated oil to a predetermined level, discharging by a siphoning action of the collected water after it reaches a predetermined level independently of the oil and gas at the same point of discharge for the oil, and discharging the collected oil after it reaches a predetermined level independently of the water and gas at the same point of discharge for the water, providing for the discharge of the collected oil by a siphoning action, or in other words the invention aims to provide a method and apparatus whereby the oil is separated from the water and the oil and water discharged independently of each other during the pumping operation and each free of gas and providing for the discharge of the collected water and the collected oil through the medium of a siphoning action whereby such action will cause the water and the oil to be directed in a manner to be drawn independently in a tubular conducting member acted upon by the pump to provide for discharge.

As illustrating an apparatus capable of carrying out a method, in accordance with this invention, references had to the accompanying drawings and in which Figure 1 is an elevation of a separator, in accordance with this invention. Figures 2, 2$^a$ and 2$^b$, when taken together, illustrate in longitudinal section upon an enlarged scale a separator, in accordance with this invention, and Figure 3 is a section on line 3—3 Figure 2$^b$.

A method for separating gas and water from oil, in accordance with this invention, consists in pumping a body of oil, gas and water into a separator element which opens into the working barrel of a well pump and providing for the separation of the oil and water from the gas by gravity and simultaneously with the separation of the gas causing the automatic discharge thereof from the separator element, collecting the oil and water within the separator element until they reach a predetermined level and with the water separating from the gas by gravity and with the oil supported on the body of separated water; providing for the discharge of the separated oil after it reaches a predetermined level by a siphoning action; collecting the separated water until it reaches a predetermined level and providing for the discharge thereof by a siphoning action, and with the discharge of the water at the same point of discharge for the oil and with the discharge of the collected oil independent of the discharge of the collected water and with the discharge of the collected water independent of the discharge for the collected oil. The foregoing steps are continuous during the pumping operation and provide for the separation and discharge of the gas, the separation and discharge of the oil, and the separation and discharge of the water. As before stated, the water is discharged at the same point of discharge for the oil, but the discharge of the gas is not had at the discharge point for the water and the oil, and the foregoing steps are automatically carried out during the pumping operation and it results in not only pumping the oil from the well, but the pumping of such oil separated from water and further the pumping of water from the well free of oil, and also it further provides for the automatic separation of gas so that the gas will not be combined with the oil, or with the water, when the oil and water are independently pumped from the well in separated bodies.

Referring to the drawings in detail, wherein like reference characters denote corresponding parts throughout the several views, the apparatus as shown capable of carrying out a method, in accordance with this invention, comprises a tubular conducting member 1 of appropriate diameter and which is connected to and communicated with the working barrel 2 of an oil pump. The member 1 is of appropriate length and depends from the working barrel 2, and the latter at its lower end, is peripherally threaded, as at 3. The lower end of the conducting member 1 is open. The member 1 provides means for conducting a body or head of oil for discharge, as well as for conducting a body or head of water for discharge, and the body of oil is discharged independently of the discharge of the body of water, or in other words the said bodies are alternately discharged during the pumping operation, at the same outlet.

Surrounding the conducting member or tube 1 and of materially greater diameter than the diameter of the latter, is a tubular casing 4 having a tapered upper end 5, which merges into a peripherally threaded annular collar 6, which is connected to the working barrel 2, by an interiorly theaded coupling sleeve 7, and the latter provides means for suspending the casing 4 from the lower end of the working barrel 2. The collar 6 and sleeve 7 are of materially greater diameter than the conducting member 1. The casing 4 has its lower end positioned a substantial distance above the lower end of the conducting member or tube 1, and abutting against the lower end of the casing 4, as well as secured therewith, in a manner to be presently referred to, is a closure disc 8 of substantial thickness and of the same diameter as the outer diameter of the casing 4. The disc 8 is formed with a centrally disposed opening 9 of substantial diameter and has the wall thereof threaded. The lower end of the conducting member or tube 1 has threaded engagement with the wall of the opening 9, but the said lower end of said member 1, does not extend entirely through the opening 9. The disc 8 is furthermore provided with a pair of openings 9′ and 9″ and the said pair of openings are arranged adjacent the opening 9. The opening 9′ is positioned at one side of the opening 9 and the opening 9″ at the other side of the opening 9. The walls of the openings 9′ and 9″ are threaded. The openings 9′ and 9″ are arranged in proximty to the edge of the disc 8. The edge of the disc 8 is threaded throughout as indicated at 10. The lower terminal portion of the casing 4 is formed with peripheral threads 11.

Threadably engaging with the peripheral threads 11, of the casing 4, as well as with the threads 10 of the disc 8, is a combined securing and suspension member, referred to generally by the reference character 12 and which depends a substantial distance below the lower end of the casing 4 and further extends a substantial distance above the disc 8. The member 12 comprises a lower portion 13, in the form of a peripherally threaded collar, an intermediate tapering portion 14 and an interiorly threaded upper portion 15 of greater diameter than the portion 13. The interiorly threaded upper portion 15 engages with the threaded lower terminal portion of the casing 4 and threads 10 on the outer edge of the disc 8, and by this arrangement the disc 8 is maintained positioned against the lower end of the casing 4 and further the member 12 is secured in suspended position.

Arranged below the member 12 and of appropriate length is a tubular element 17, which is closed at its bottom, as at 18, and which provides a receiving chamber 19 for the separated oil or the separated water and from said chamber 19 the oil or water is drawn up through the conducting member or tube 1 by the action of the pump. The tubular element 17 is provided at its upper end terminal portion with peripheral threads 20 and engaging with these latter, as well as with the peripherally threaded collar 13, is an interiorly threaded coupling sleeve 21 for securing the tubular element 17 with the member 12.

The casing 4, at a point between its transverse center and its upper end is formed with superposed sets of circumferentially extending openings 22 providing inlets for a body of gas, oil and water, and the tapered portion 5 of the casing 4 is formed with superposed sets of circumferentially extending openings 23, which provide outlets for the separated gas.

Secured to the threaded wall of the opening 9, below the lower end of the conducting member or tube 1, is a depending tube 24 which forms a continuation of the member 1. The tube 24 opens at its lower end in the collar 13 of the member 12 and forms an inlet for the conducting member or tube 1.

Secured in the upper part of the opening 9″ is the lower end of a vertically disposed substantially U-shaped siphoning tube, referred to generally by the reference character 28 and which is arranged in the lower portion of the tubular casing 4. The outer leg of the siphoning tube is indicated at 29, and the inner leg at 30. The outer leg is of greater length than the leg 30 and is secured in the upper portion of the opening 9″. The inlet end 31 of the leg 30 is positioned a substantial distance above the disc 8. The lower portion of the casing 4, in connection with the disc 8, provides what may be termed a water collecting chamber and within said chamber is arranged the siphoning tube 28. Secured at its upper end in the lower portion of the opening 9″ and depending from the disc 8 is an inclined discharge nozzle 32, which opens into the collar 13 of the member 12. The nozzle 32 forms a continuation of the leg 29 of the siphoning tube.

Secured in the upper part of the opening 9′ is the lower end of a vertically disposed substantially U-shaped siphoning tube, referred to generally by the reference character 33. The tube 33 is of materially greater height than the tube 28. The outer leg of the tube 33 is indicated at 34 and the inner leg at 35. The leg 34 is of greater length than the leg 35 and said leg 34 is secured to the wall of the opening 9′. The inlet end of the leg 35 is indicated at 36 and is positioned above the top of the siphoning tube 28. The siphoning tube 33 extends above the water collecting chamber 27. Connected in the lower part of the opening 9' and depending from the disc 8 is an inclined discharge nozzle 37 which opens into the collar 13 of the member 12. The nozzle 37 forms a continuation of the leg 34 of the siphoning tube 33.

The oil level is indicated at A and is at the top of the siphoning tube 33 and the water level is indicated at B and is at the top of the siphoning tube 28. The travel of the gas is indicated by the arrow C. The arrows D indicate the entering of a body of gas, oil and water into the casing 4. The arrows E indicate the travel of water and the arrows F indicate the travel of the oil. The arrows G show the course taken by the gas after it has been agitated out of the oil by being drawn through inlets 22 and escaping through the outlets 23 to the outside of the separator. With respect to the operation of the separator there should be fluid in the oil well to supply the tube or casing 4 continuously through the inlet 22, but when the body of fluid within the well is not sufficient to supply the tube or casing 4, or falls below the inlet 22, then the pump is shut down. If the fluid within the tube or casing 4 reaches below the intake 31 so gas will enter such intake, then the pump should be shut down, or it is running too fast in taking the fluid away from the well faster than it comes into the tube or casing 4. The oil and water entering through the intake 22 will be separated, as the water will fall to the bottom of the tube or casing 4 and the oil will settle on the water and it is pulled through the siphoning tube 29 by the action of the pump. When the water reaches the intake 31, then the lighter fluid that has been held back in tube 34, is pulled through by action of the pump, but the heavier water is not pulled through the tube 29 because it is heavier than the fluid in tube 34. The water will not be pulled through siphon 28 until it reaches lever B, which is at the bend of the tube 29, and after the heavier fluid starts through tube 29 and fills the receptacle 19 it floats the lighter fluid back in tube 34 and constitutes a seal therefor. This operation provides for separating bodies of oil and water to be independently discharged during the pumping action of the well when a body of oil and water enters the tube or casing 4 through the inlet 22.

The intermediate portion of the member 12 provides a directing chamber. The lower portion of the casing 4, in connection with the closure 8 acts as a sand trap.

The method as herein set forth, as well as the apparatus illustrated capable of carrying out the method, provides means for separating gas, oil and water and for independently discharging the separated oil and water, and it is thought the many advantages of the invention as hereinbefore set forth can be readily understood, and although the preferred embodiment of an apparatus capable of carrying out the method is as illustrated and described, yet it is to be understood that changes therein can be and which will fall within the scope of the invention as claimed.

What we claim is:—

A separator comprising a tubular conducting element common to oil and water and adapted to be connected to and communicate with the pumping barrel of an oil well pump, a casing surrounding said tube and having the latter depending therefrom, a closure secured to the lower end of the casing and having said element extending therethrough, a receiving chamber arranged below said closure and into which said element opens, a water siphoning element positioned within said casing, extending through said closure and opening into said chamber, and an oil siphoning element arranged within said casing, projecting above the other siphoning element, extending through said closure and opening into the said chamber, said casing provided intermediate its ends with inlets for oil and water, each of said siphoning elements of U-shape form and having one leg of greater length than the other, the elongated legs thereof opening into said receiving chamber, the shorter leg of the water siphoning element positioned a substantial distance from said closure and the shorter leg of the oil siphoning element positioned a substantial distance above the top of the water siphoning element.

In testimony whereof, we affix our signatures hereto.

SEBASTIAN L. CALVERT.
VICTOR CHANCELLOR.